(No Model.)

H. BLAKE.
STOPPER CARRIER FOR BOTTLES.

No. 427,729. Patented May 13, 1890.

WITNESSES:
Geo. A. Fullerton
John R. Snow.

INVENTOR:
Henry Blake
by his attorneys
Magnadin & Blake

UNITED STATES PATENT OFFICE.

HENRY BLAKE, OF PEPPERELL, MASSACHUSETTS, ASSIGNOR TO THE FACILE BOTTLE STOPPLE COMPANY, OF NEW YORK, N. Y.

STOPPER-CARRIER FOR BOTTLES.

SPECIFICATION forming part of Letters Patent No. 427,729, dated May 13, 1890.

Application filed August 23, 1889. Serial No. 321,793. (No model.)

*To all whom it may concern:*

Be it known that I, HENRY BLAKE, of Pepperell, in the county of Middlesex and State of Massachusetts, have invented a new and useful Improvement in Stopper-Carriers for Bottles and other Receptacles, of which the following is a specification, reference being had to the accompanying drawings, in which—

Figure 1:
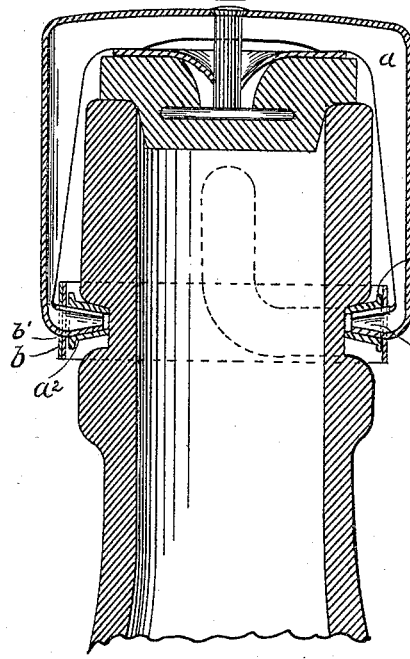
Figure 2:
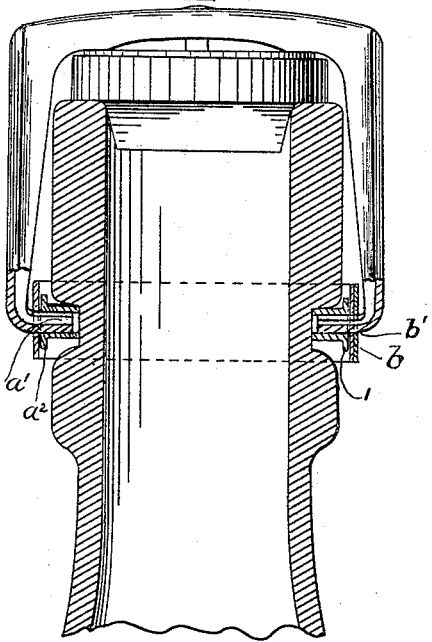
Figure 3:
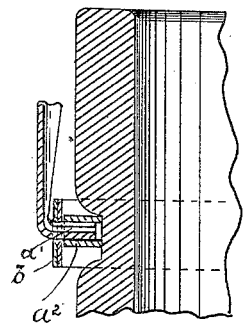

Figure 1 is a central sectional elevation of part of a bottle provided with my improved stopper-carrier in its preferred form. Figs. 2 and 3 are elevations, partly in section, of part of a bottle provided with other forms of my new stopper-carrier.

My invention relates to stopper-carriers for bottles and other receptacles which have legs with inwardly-turned ends and are adapted for receptacles the necks of which have angular grooves. Hitherto it has been found on turning the bail to secure the stopper in place that the inwardly-turned ends of the legs of the bail have rubbed with considerable harshness against the walls of the grooves, offering undue resistance to the hand and tending to disintegrate the glass.

My invention seeks to obviate these objections; and it consists in the combination of the inwardly-turned ends of the bail-legs with bearings of any suitable form and material.

In the drawings, $a$ is a bail of the preferred form, $a'$ the inwardly-turned ends of its legs, and $a^2$ one form of bearing. The preferred form of bearing $a^2$ is an eyelet, which is slightly tapered from head to foot, as shown in Fig. 1. The inwardly-turned ends $a'$ should be slightly tapered, as shown in Fig. 1, so that when the parts are assembled the inwardly-turned ends are made fast in the eyelet. The head 1 of the eyelet-bearing bears against the inner surface of the band $b$ and so tends to prevent the bail from being sprung off the receptacle. I prefer to make the bearings of brass or other soft metal, and to have them in the form of an eyelet; but they may be of other metal and also of other forms, as will be plain from Figs. 2 and 3. The band $b$ is perforated at $b'$ to receive the inwardly-turned ends of the bail.

The parts are readily assembled by placing a bearing in a groove in the neck, placing a band around the neck of the bottle in such wise as to bring the perforation in the band over the hole through the bearing, inserting one of the inwardly-turned ends of the legs of the bail through the perforation in the band and into the hole in the bearing, and then inserting the other inwardly-turned end through the band and into a hole in the other bearing. When thus assembled, I gently tap the heels of the legs of the bail to force the inwardly-turned ends snugly into the bearings.

By providing the inwardly-turned ends of the bail-legs with bearings the stopper-carrier is much more easily turned to secure or remove the stopper, and the tendency of the inwardly-turned ends to fracture the walls of the grooves in the receptacle is minimized.

The parts not lettered are old and well known and will be understood by all skilled in the art without description.

What I claim is—

1. The combination, with a bail having legs with inwardly-turned ends and a band having holes to receive said inwardly-turned ends, of bearings mounted on the inwardly-turned ends, substantially as and for the purpose set forth.

2. The combination of a receptacle having grooves to receive the inwardly-turned ends of the bail with a bail having inwardly-turned ends provided with bearings mounted thereon, substantially as and for the purpose set forth.

HENRY BLAKE.

Witnesses:
GEO. A. FULLERTON,
EDWARD S. BEACH.